United States Patent

Naganuma

[11] Patent Number: 5,812,307
[45] Date of Patent: *Sep. 22, 1998

[54] OPTICAL DEVICE AND OPTICAL AMPLIFIER

[75] Inventor: Norihisa Naganuma, Sapporo, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 851,705

[22] Filed: May 6, 1997

[30] Foreign Application Priority Data

Dec. 13, 1996 [JP] Japan ................................ 8-334125

[51] Int. Cl.⁶ .................... H01S 3/06; G02B 27/14
[52] U.S. Cl. ...................... 359/341; 359/629; 385/47
[58] Field of Search ............................... 359/341, 618, 359/629, 627; 385/31, 47, 49

[56] References Cited

U.S. PATENT DOCUMENTS

| | | | |
|---|---|---|---|
| 5,355,249 | 10/1994 | Souda et al. | 359/341 |
| 5,510,932 | 4/1996 | Go et al. | 359/341 |
| 5,642,448 | 6/1997 | Pan et al. | 385/31 |
| 5,661,835 | 8/1997 | Kato et al. | 385/92 |

FOREIGN PATENT DOCUMENTS 6-118235  4/1994  Japan .

*Primary Examiner*—Mark Hellner
*Attorney, Agent, or Firm*—Staas & Halsey

[57] ABSTRACT

An optical device consists of integrated parts and is used for an optical amplifier.

The optical device has first to third assemblies. The first assembly includes two optical fibers each for transmitting a beam and a lens for receiving the beams and providing collimated beams oriented in different directions at given angles. The second assembly includes an optical fiber and a lens to receive one of the collimated beams. The third assembly includes an optical fiber and a lens to receive the other collimated beam. At least one of the second and third assemblies has a second optical fiber. An optical film is arranged in front of the lens of the assembly having the second optical fiber. The optical film reflects an optical signal whose wavelength is different from that of the collimated beam. The two optical fibers of the assembly having the second optical fiber are coupled together through the lens and optical film, to pass the optical signal between the two optical fibers.

26 Claims, 6 Drawing Sheets

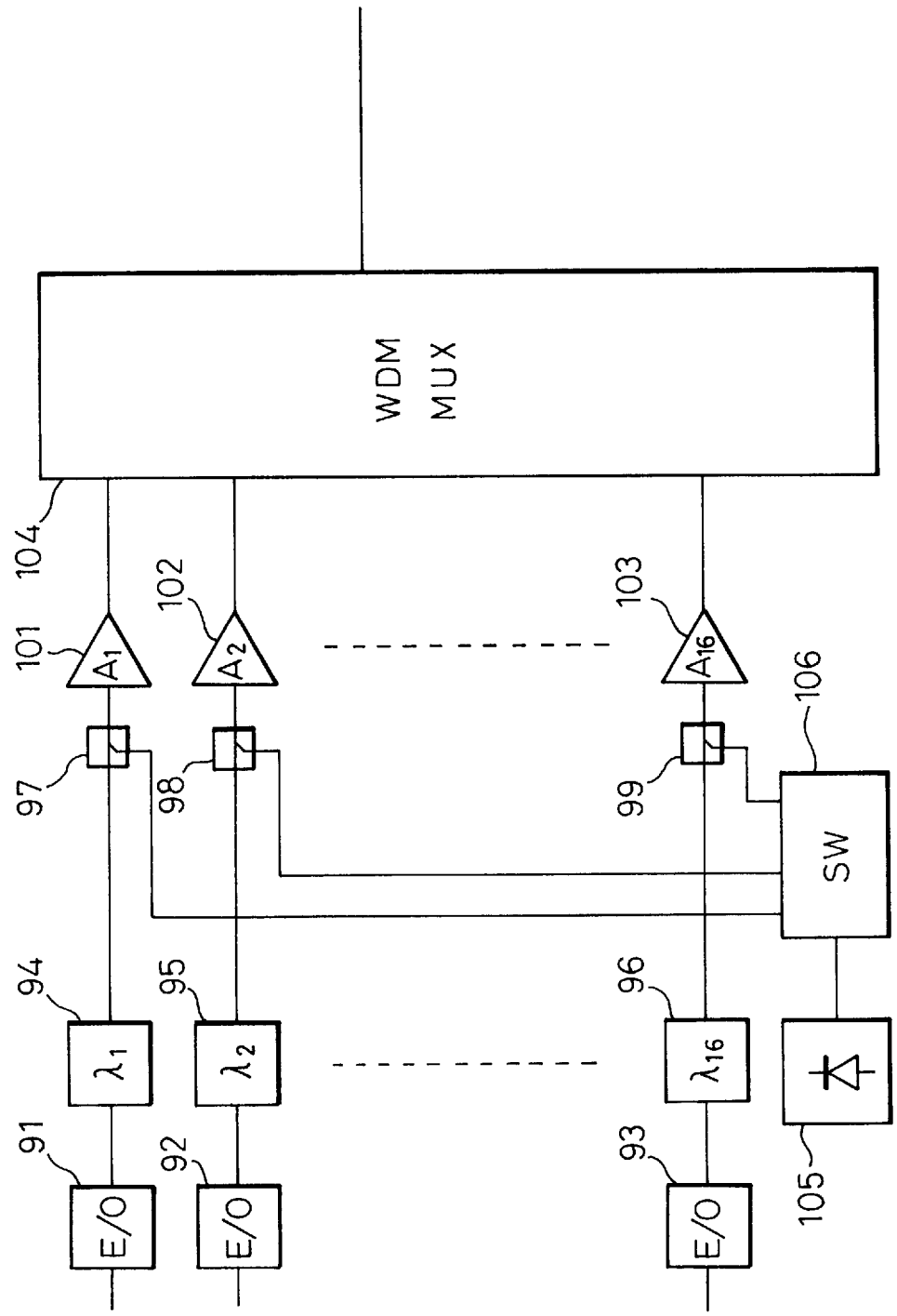

OPTICAL DEVICE AND OPTICAL AMPLIFIER

BACKGROUND OF THE INVENTION

1. Field of the Invention

The present invention relates to an optical device and an optical amplifier and, particularly, to an optical device having integrated parts and an optical amplifier employing the optical device.

2. Description of the Related Art

A wavelength division multiplexing (WDM) technique for optical communication is important to solve the nonlinearity problem of optical fibers and improve the capacity thereof. The WDM technique multiplexes 4 to 16 optical wavelengths and amplifies each wavelength to sufficient power.

The WDM technique requires an optical amplifier for each optical wavelength. This results in increasing the size and cost of the system concerned. The optical amplifiers must be compact and low cost.

Generally, the optical amplifier consists of an erbium-doped fiber (EDF), an excitation laser (LD), and optical parts including a multiplexer. The optical parts are arranged in front and rear stages on each side of the EDF. These optical parts are many and need a large space. To reduce the size and cost of the optical amplifier, a prior art device integrates the optical parts of the front stage into a module and those of the rear stage into another module. However, to further reduce the size and cost of the optical amplifier, the optical parts must be further integrated.

SUMMARY OF THE INVENTION

An object of the present invention is to integrate the front and rear optical modules of an optical amplifier into one (i.e., a single module) by employing two-optical fiber ferrules and simple optical circuits.

In order to accomplish the object, the present invention comprises an optical device having first to third assemblies of optical elements. The first assembly has two optical fibers and a lens. The two optical fibers guide respective beams, to the lens, which provides two spatial collimated beams oriented in different directions at given angles. The second and third assemblies have each at least an optical fiber and a lens and are arranged to align with the collimated beams, respectively. At least one of the second and third assemblies has an additional optical fiber and an optical film. This optical device in accordance with the invention is used to form an optical amplifier.

The optical film may comprise any one of a band-pass filter, a long-wave pass filter, and a short-wave pass filter, and passes the collimated beam from the first assembly and reflects other beams. Alternatively, the optical film may be a coupler film that branches the collimated beam from the first assembly into two directions. An isolator may be arranged after the first assembly, to pass the two collimated beams. Between the first assembly and at least one of the second and third assemblies, there may be arranged a coupler film in the path of the collimated beam, a photodiode in a reflection path of the coupler film, and a band pass filter.

On the beam emitting side of the first assembly, an optical film may be arranged to reflect an optical signal whose wavelength differs from those of the collimated beams. The optical film and the lens of the first assembly function to connect the two optical fibers of the first assembly to each other and pass the optical signal between the two optical fibers. The optical film reflects an excitation beam for amplifying a signal beam passed through one of the two optical fibers that is doped with rare earth material. One of the two optical fibers of the first assembly transmits a multiplexed form of the signal beam and excitation beam.

BRIEF DESCRIPTION OF THE DRAWINGS

The present invention will be more clearly understood from the description of the preferred embodiments as set forth below with reference to the accompanying drawings, wherein:

FIG. 6 shows a WDM system according to the present invention.

DESCRIPTION OF THE PREFERRED EMBODIMENTS

Figure 1:
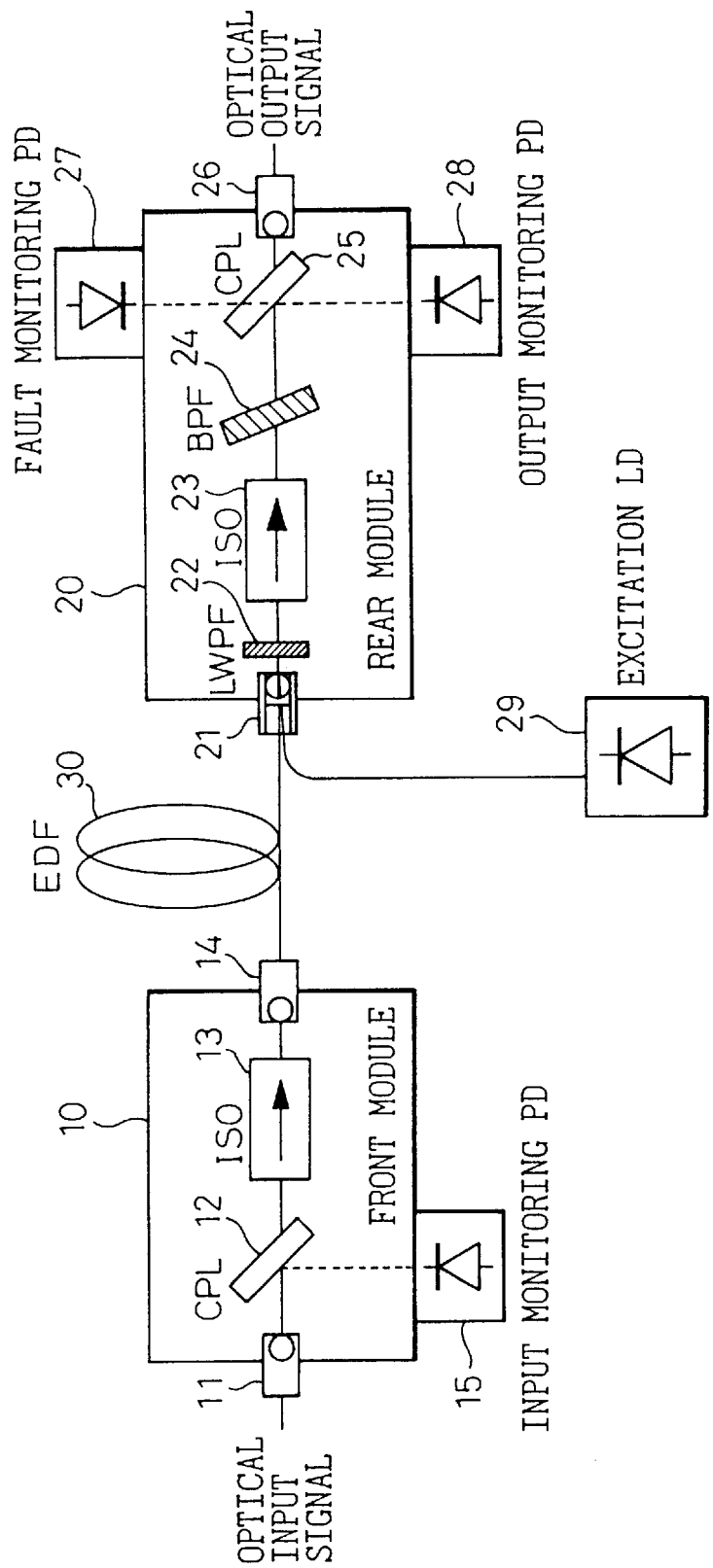
FIG. 1 shows an optical amplifier employing an erbium-doped fiber (EDF) according to a prior art.

For a better understanding of the preferred embodiments of the present invention, an optical amplifier employing an erbium-doped fiber (EDF) according to the prior art will be explained with reference to FIG. 1.

The optical amplifier includes a front module 10, the EDF 30, and a rear module 20. The front module 10 has a lens assembly 11 having a lens indicated with a white circle. The lens receives an optical input signal from an optical fiber and provides a collimated beam.

The collimated beam is supplied to an optical coupler (CPL) 12, which provides an optical isolator (ISO) 13 with a main signal beam and provides an input monitoring photodiode (PD) 15 with a part of the beam. The photodiode 15 detects whether or not an input beam is present. The optical isolator 13 stops any beam coming from the output side of the front module 10 and provides a lens assembly 14 with an output beam.

The lens assembly 14 is connected to an end of the EDF 30 that amplifies the beam. The length of the EDF 30 is about 10 to 50 m. The other end of the EDF 30 is connected to a lens assembly 21 of the rear module 20. The EDF 30 is made by injecting erbium (Er) ions into the core of an optical fiber. The EDF 30 receives an optical signal of 1.55 $\mu$m wavelength and an excitation beam of 1.48 $\mu$m or 0.98 $\mu$m wavelength and provides an optical signal of 1.55 $\mu$m wavelength whose power is amplified by about 0 to 20 dBm.

The excitation beam of 1.48 $\mu$m wavelength realizes high-power output, and that of 0.98 $\mu$m wavelength realizes low-noise output. There are two types of excitation. One is front excitation that applies an excitation beam to an optical signal on the input side. The other is rear excitation that applies an excitation beam to an optical signal on the output side. The front excitation realizes low-noise output, and the rear excitation realizes high-power output. The prior art of FIG. 1 employs the rear excitation.

The lens assembly 21 of the rear module 20 has a two-core ferrule for receiving the optical signal from the EDF 30 and an excitation beam from an excitation laser diode (LD) 29. The excitation beam has a shorter wavelength than the optical signal and is reflected by a long wave pass filter (LWPF) 22 in the opposite direction and is used for a rear excitation.

The optical signal passed through the lens assembly 21 and filter 22 is passed through an optical isolator (ISO) 23 and is applied to a band pass filter (BPF) 24. The filter 24 removes noise components caused by amplified spontaneous emission (ASE) that always occurs when the EDF is used to amplify a beam. Namely, the filter 24 passes only the optical signal.

The optical signal is partly branched by an optical coupler (CPL) 25 toward an output monitoring photodiode (PD) 28 and a fault monitoring photodiode (PD) 27. At this time, the main optical signal is provided outside the rear module 20 through a lens assembly 26. The diode 28 monitors the level of the optical signal, and the diode 27 monitors a fault.

As explained above, the wavelength division multiplexing (WDM) technique needs as many optical amplifiers as the number of wavelengths to be multiplexed. Accordingly, the optical amplifiers must be compact and low cost, to reduce the size and cost of the system concerned.

A standard optical amplifier consists of an EDF, an excitation laser, and optical parts including a multiplexer. The optical parts are arranged in front and rear stages on each side of the EDF. These optical parts are many and need a large space. To reduce the size and cost of the optical amplifier, the prior art of FIG. 1 integrates the optical parts into the front and rear modules. This integration, however, is insufficient because it still requires two modules.

Next, the preferred embodiments of the present invention will be explained.

Figure 2:
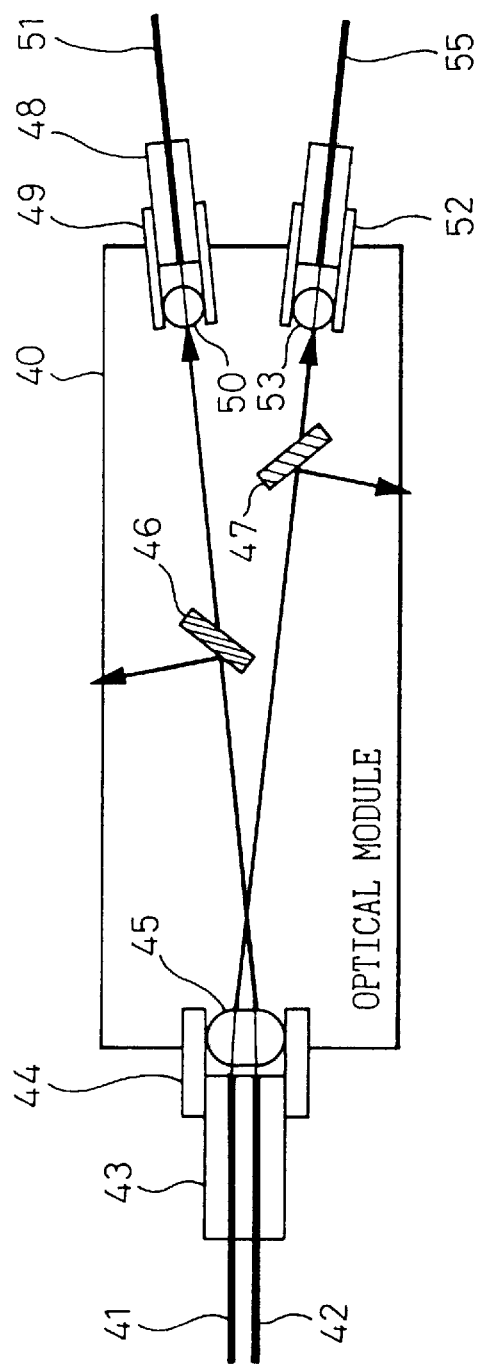
FIG. 2 shows an optical device for an optical amplifier according to a first principle of the present invention.

FIG. 2 shows an optical device 40 for an optical amplifier according to the first principle of the present invention. Two optical fibers 41 and 42 are attached to a two-core ferrule 43. A lens holder 44 holds a collimator lens 45, which receives optical beams from the optical fibers 41 and 42 and provides two spatial collimated beams that cross each other at a given angle and are received independently of each other.

The optical fiber 42 corresponds to the optical fiber connected to the input end of the front module 10 of FIG. 1, and the optical fiber 41 corresponds to the EDF 30 connected to the input end of the rear module 20 of FIG. 1. Namely, referring to FIGS. 1 and 2, the output of the front module 10 is supplied to an optical fiber 51, and the output of the rear module 20 is supplied to an optical fiber 55. An optical coupler 46 branches a part of one of the collimated beams toward an input monitoring photodiode (15 of FIG. 1), and an optical coupler 47 branches a part of the other collimated beam toward an output monitoring photodiode (28 of FIG. 1).

The operation of the optical device of FIG. 2 will be explained in detail.

The optical fiber 42 belongs to a first assembly and receives an optical signal to be amplified. The optical signal is passed through the lens 45 and is made incident to the optical fiber 51 through a lens 50 of a second assembly. The optical fiber 51 is connected to an end of an erbium-doped fiber amplifier (EDFA) (not shown). The other end of the EDFA is connected to the optical fiber 41 belonging to the first assembly. The optical fibers 41 and 51 themselves may serve as the EDFA.

The beam from the optical fiber 41 is passed through the lens 45 and is made incident to the optical fiber 55 through a lens 53 of a third assembly. The optical coupler 46 between the optical fibers 42 and 51 is used to determine whether or not an optical input signal is present. The optical coupler 47 between the optical fibers 41 and 55 is used to monitor an amplified optical signal.

An excitation beam must be made incident to one of the optical fibers 42 and 55. The first principle of the present invention is characterized by 1) integrating the front and rear stages, or modules of an optical amplifier into one with the use of a two-core ferrule, 2) independently arranging optical elements, such as optical films, in respective separate spatial beams provided by the two-core ferrule, and 3) employing separate output fibers to independently adjust front and rear optical paths.

Figure 3:
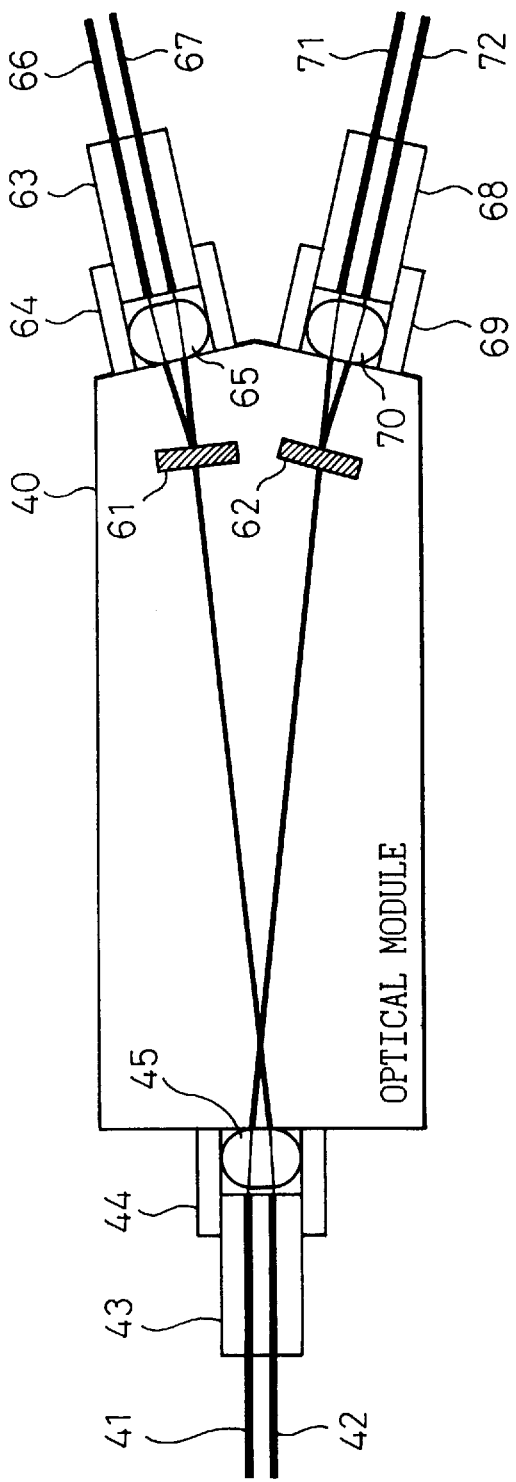
FIG. 3 shows an optical device for an optical amplifier according to a second principle of the present invention.

FIG. 3 shows an optical device 40 according to the second principle of the present invention.

The optical device of FIG. 2 has no means to apply an excitation beam, generated by an excitation laser diode (29 of FIG. 1) to the EDFA connected between the optical fibers 51 and 41. Accordingly, the second principle arranges two-core ferrules on the output side, too, thereby to completely integrate the front and rear modules into one.

In FIG. 3, the two-core ferrule is provided for each output assembly. An optical fiber 67 corresponds to the optical fiber 51 of FIG. 2, and an optical fiber 71 corresponds to the optical fiber 55 of FIG. 2. Long wave pass filters (LWPFS) 61 and 62 are provided for output lenses 65 and 70, respectively. The LWPF 61 reflects only an excitation beam provided by an external excitation laser diode (29 of FIG. 1) through an optical fiber 66, and the reflected excitation beam is applied to the optical fiber 67 that is connected to an erbium-doped fiber amplifier (EDFA).

The operation of the optical device of FIG. 3 will be explained in detail.

An optical fiber 42 belonging to a first assembly receives an optical signal to be amplified. The optical signal is passed through a collimator lens 45 and is made incident to the optical fiber 67 through the lens 65 of a second assembly. The optical fiber 67 is connected to a terminal of the EDFA (not shown). The other terminal of the EDFA is connected to an optical fiber 41 of the first assembly.

The optical fibers 41 and 67 themselves may serve as the EDFA. The beam from the optical fiber 41 is passed through the lens 45 and is made incident to the optical fiber 71 through the lens 70 of a third assembly.

The LWPF 61 between the optical fibers 42 and 67 passes the collimated optical signal having a long wavelength, provided through the optical fiber 42, and reflects the excitation beam, having a short wavelength, provided through the optical fiber 66 toward the optical fiber 67. As a result, the optical fiber 67 receives a multiplexed form of the optical signal and excitation beam, and the EDFA connected to the optical fiber 67 amplifies the optical signal based on the excitation beam. This is the front excitation opposite to the rear excitation of FIG. 1.

The LWPF 62 between the optical fibers 41 and 71 passes the amplified optical signal from the optical fiber 41 and reflects a fault monitoring signal beam having a short wavelength from an optical fiber 72 toward the optical fiber 71. Consequently, this optical device provides an external apparatus with the optical output signal as well as the fault monitoring signal. The external apparatus may use the fault monitoring signal for system maintenance and management.

In this way, the present invention employs a common collimator lens to produce spatial beams that cross each other and enter two independent lens systems. The present invention employs two-core ferrules for input and output optical fibers and arranges optical elements in the spatial beams, thereby realizing an integrated optical device.

Figure 4:
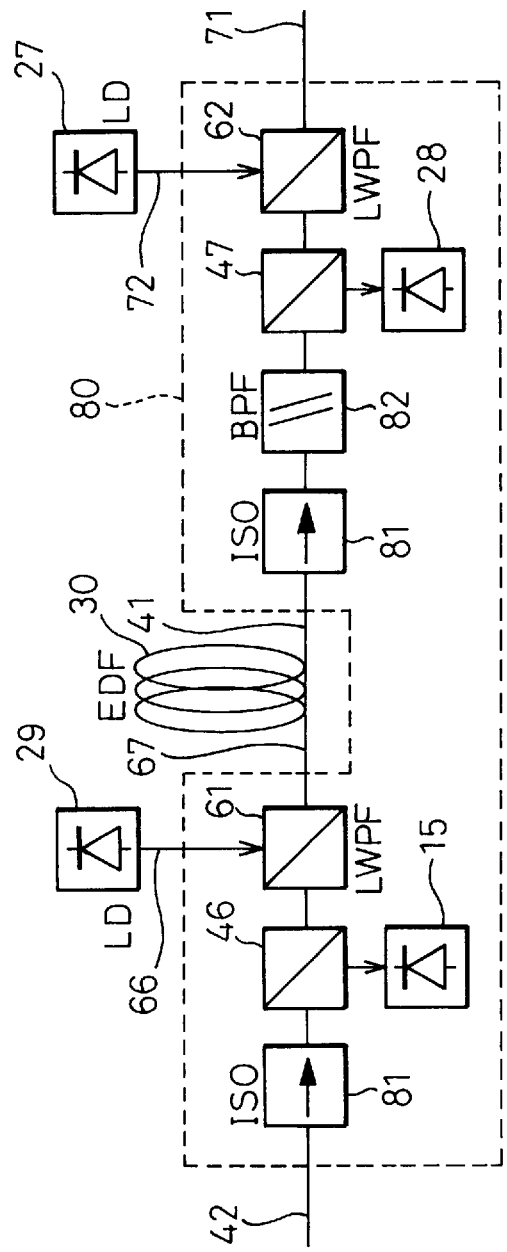
FIG. 4 shows an optical device according to an embodiment of the present invention.
Figure 5:
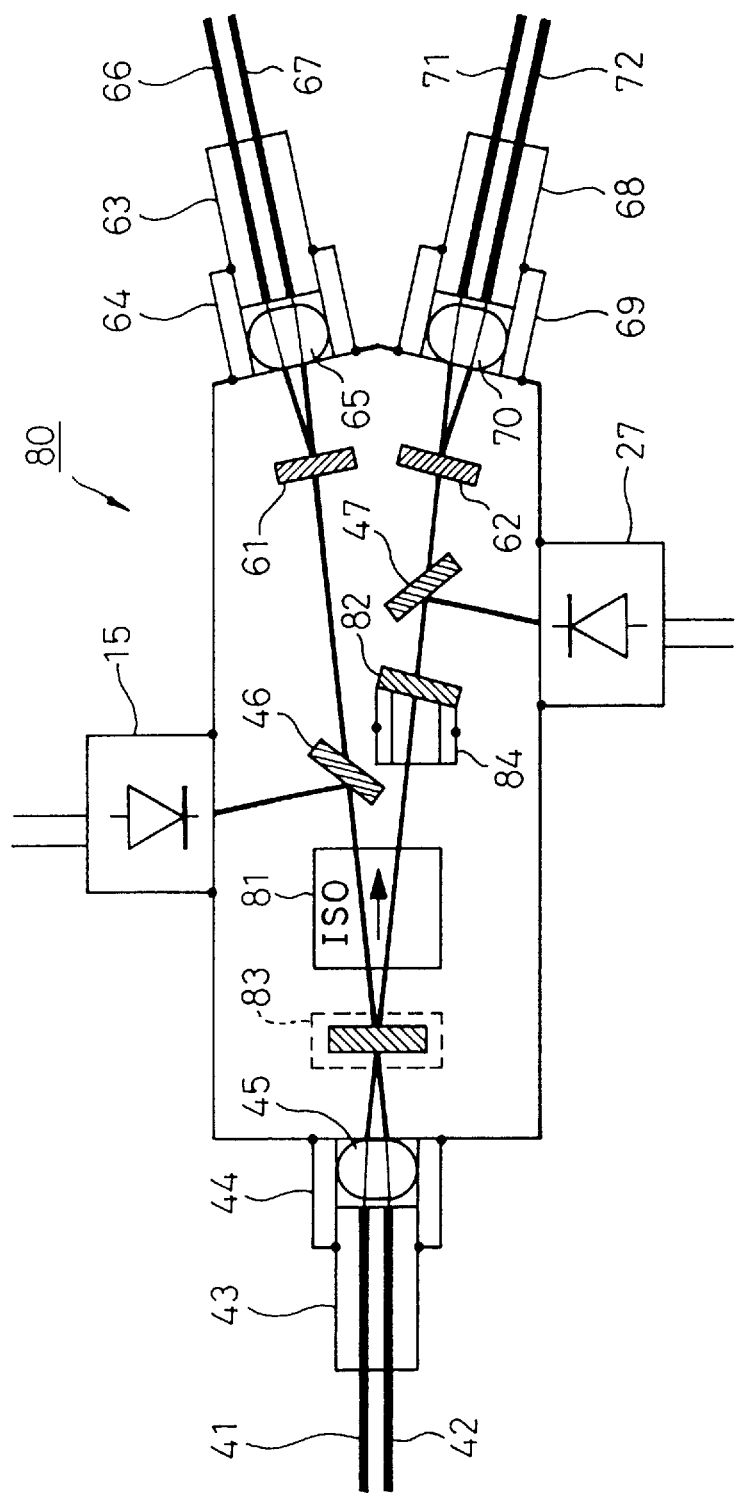
FIG. 5 shows optical elements of the device of FIG. 4.

FIGS. 4 and 5 show an optical device according to an embodiment of the present invention, in which FIG. 4 is an optical circuit diagram and FIG. 5 shows corresponding optical elements. In FIG. 4, the left side of an erbium-doped fiber (EDP) 30 is a front stage and the right side thereof is a rear stage.

In FIG. 5, an input optical fiber 42 for the front stage and an input optical fiber 41 for the rear stage are fixed to a ceramic capillary ferrule 43. The ferrule 43 has two holes to receive and fix the optical fibers 42 and 41, respectively. A lens 45 is pushed into a lens holder 44 that houses the ferrule 43. Respective distance (focal distances) between the optical fibers 41 and 42 and the lens 45 are adjusted so that corresponding optical signal beams from the optical fibers 41 and 42 may provide collimated beams.

Thereafter, the ferrule 43 is fixed to the lens holder 44.

The center of the lens 45 is aligned with the center between the optical fibers 41 and 42 so that the collimated beams from the lens 45 are inclined with respect to the respective axes of the optical fibers 41 and 42 at given angles. Just after the lens 45, there are a long wave pass filter (LWPF) film 83 and an isolator (ISO) 81. Since the beams from the optical fibers 41 and 42 both pass the isolator 81, this embodiment is able to reduce the number of isolators (ISO's), which are among the most expensive optical parts, from the ISO's two of the prior art to one ISO.

After the isolator 81, the beams run along separate paths into collimator lenses 65 and 70 that are connected to optical fibers 67 and 71, respectively. A coupler film 46 is arranged between the isolator 81 and the lens 65 so that a photodiode 15 arranged in an optical device package may monitor the level of the optical signal. The coupler film 46 is fixed to the package. The photodiode 15 is fixed to the package after the optical axis thereof is adjusted.

A band pass filter 82 and a coupler film 47 are arranged between the isolator 81 and the lens 70 so that a photodiode 27 arranged in the package may monitor the level of the output beam. The band pass filter 82 is fixed on a rotary base 84 so that the center wavelength of the filter 82 is tuned by adjusting the angle of the rotary base 84. Thereafter, the rotary base 84 is fixed to the package.

Two-core ferrules 63 and 68 are provided for second and third assemblies serving as output ports. The ferrules 63 and 68 are each the same as the ferrule 43 provided for a first assembly serving as an input port. Filter films 61 and 62 face the lenses 65 and 70, respectively. An optical fiber 66 of the second assembly is used to apply an excitation beam of 1.48 $\mu$m wavelength. An optical fiber 72 of the third assembly is used to apply a supervisory signal (SV) of 1.52 $\mu$m wavelength.

The excitation beam from the optical fiber 66 is reflected by the filter film 61 toward the optical fiber 67. The supervisory beam from the optical fiber 72 is reflected by the filter film 62 toward the optical fiber 71. The filter films 61 and 62 are adjusted with respect to the respective beams and optical fibers 67 and 71 and are fixed. As a result, the excitation beam is multiplexed with an input signal beam, and the supervisory beam is multiplexed with an output signal beam.

The multiplexed signal beam based on the excitation and input signal beams in the optical fiber 67 is applied to the EDF 30, which amplifies the multiplexed beam and supplies it to the optical fiber 41. The multiplexed signal based on the supervisory and output signal beams is supplied to an external apparatus such as an optical receiver.

The function of the LWPF film 83 arranged just after the lens 45 will be explained with reference to FIG. 6. FIG. 6 shows a WDM system employing a plurality of the optical devices of the present invention.

The WDA system of FIG. 6 multiplexes 16 wavelengths. Sixteen electric signals are converted into optical signals through electrooptic (E/O) converters 91 to 93. Optical transmitters ($\lambda$1 to $\lambda$16) 94 to 96 provide optical signals having respective wavelengths. The optical signals are applied to optical couplers 97 to 99 and to optical fibers (42 of FIG. 5), which are connected to optical amplifiers 101 to 103 employing the optical devices of the present invention.

The optical couplers 97 to 99 also receive an excitation beam from a common excitation laser 105 through an optical switch 106. If any one of the excitation lasers 29 (FIG. 4) of the optical amplifiers 101 to 103 fails, the excitation laser 105 provides the failed optical amplifier with an excitation beam through the optical switch 106. As a result, the failed optical amplifier receives a multiplexed beam of the excitation beam and a signal beam.

Returning to FIG. 4, the LWPF 83 reflects the excitation beam contained in the multiplexed beam toward the EDF 30 through the lens 45 and fiber 41. Consequently, the failed optical amplifier carries out the rear excitation. In this way, the LWPF 83 improves the reliability of the system without employing a double arrangement of expensive excitation lasers for each optical amplifier.

As explained above, the present invention integrates the front and rear optical parts of an optical amplifier into one module, thereby reducing the size and cost of the optical amplifier. The front and rear stages of this optical amplifier share an isolator, a lens, and a package, to further reduce the size and cost of the optical amplifier. A system employing a plurality of the optical amplifiers of the present invention may employ a common excitation laser to improve the reliability of the system against a failure in any one of excitation lasers provided for the optical amplifiers.

What is claimed is:

1. An optical device, comprising:

a first assembly including two optical fibers, each for transmitting a beam, and a lens for receiving the beams and providing collimated beams oriented in different directions at given angles;

a second assembly comprising an optical fiber and a lens receiving one of the collimated beam;

a third assembly comprising an optical fiber and a lens receiving the other collimated beam;

an additional optical fiber provided for at least one of the second and third assemblies; and an optical film arranged between the first assembly and the assembly that is provided with the additional optical fiber.

2. The optical device of claim 1, wherein the optical film is one of a band pass filter, a long wave pass filter, and a short wave pass filter for passing the collimated beam from the first assembly and reflecting other beams, or a coupler film for branching the collimated beam from the first assembly into two directions.

3. The optical device of claim 1, further comprising an isolator arranged after the first assembly, to pass the two collimated beams provided by the first assembly.

4. The optical device of claim 1, further comprising:
a coupler film arranged in at least one of the collimated beams between the first assembly and the second and third assemblies; and
a photodiode arranged in a reflection path of the coupler film.

5. The optical device of claim 1, further comprising a band pass filter arranged in at least one of the collimated beams between the first assembly and the second and third assemblies.

6. The optical device of claim 1, further comprising an optical film arranged on the output side of the first assembly, to reflect any optical signal whose wavelength differs from that of the collimated beams, so that the two optical fibers of the first assembly are coupled together to pass the optical signal between them through the lens and optical film.

7. The optical device of claim 6, wherein the optical film reflects an excitation beam for amplifying a signal beam transmitted through an optical fiber containing rare earth additives.

8. The optical device of claim 7, wherein one of the two fibers of the first assembly transmits a multiplexed form of a signal beam and an excitation beam.

9. An optical amplifier, comprising:
a first assembly including first and second optical fibers, a first ferrule holding the first and second optical fibers, and a lens attached to an end of the first ferrule;
a second assembly including third and fourth optical fibers, a second ferrule holding the third and fourth optical fibers, and a lens attached to an end of the second ferrule;
a third assembly including at least one optical fiber, a third ferrule holding the at least one optical fiber, and a third lens attached to an end of the third ferrule;
a rare-earth-doped optical fiber arranged between the first optical fiber and the third optical fiber, alternatively, the first and third optical fibers being made of a single rare-earth-doped optical fiber; and
an optical film arranged between the first assembly and the second assembly, for reflecting a beam from the fourth optical fiber.

10. The optical amplifier of claim 9, further comprising:
a coupler film arranged between the first assembly and at least one of the second and third assemblies; and
a photodiode arranged in a reflection path of the coupler film.

11. An optical device comprising:
a first assembly including two optical fibers, each transmitting a beam, and a lens receiving the beams and outputting corresponding collimated beams oriented in respective, different directions at corresponding angles;
a second assembly, including an optical fiber and a lens, receiving one of the collimated beams;
a third assembly, including an optical fiber and a lens, receiving the other one of the collimated beams;
an additional optical fiber associated with a selected one of the second and third assemblies; and
an optical film arranged between the first assembly and the selected one of the second and third assemblies.

12. The optical device of claim 11, wherein the optical film is a selected one of a band pass filter, a long wave pass filter and a short wave pass filter and passes the first collimated beam while reflecting other beams, or a coupler film branching the first collimated beam into two different directions.

13. The optical device of claim 11, further comprising an isolator receiving and passing the first and second collimated beams output by the first assembly.

14. The optical device of claim 11, further comprising:
a coupler film receiving one of the first and second collimated beams and disposed between the first assembly and a corresponding one of the second and third assemblies, the coupler film having a reflection path; and
a photodiode disposed in the reflection path of the coupler film.

15. The optical device of claim 11, further comprising a band pass filter receiving one of the first and second collimated beams and disposed between the first assembly and a corresponding one of the second and third assemblies.

16. The optical device of claim 11, further comprising a second optical film receiving the first collimated beam output by the first assembly, and reflected any optical signal having a wavelength differing from that of the first collimated beam, the first and second optical fibers of the first assembly being coupled together and passing the optical signal between them through the lens and optical film.

17. The optical device of claim 16, wherein the second optical film reflects an excitation beam, the excitation beam amplifying a signal beam transmitted through an optical fiber containing rare earth additives.

18. The optical device of claim 17, wherein one of the two fibers of the first assembly transmits a multiplexed form of a signal beam and an excitation beam.

19. An optical device, comprising:
a first assembly comprising first and second optical fibers respectively transmitting first and second beams and a lens receiving the first and second beams and outputting corresponding first and second collimated beams oriented in respective and different, first and second directions at given angles;
a second assembly comprising an optical fiber and a lens receiving the first collimated beam;
a third assembly comprising an optical fiber and a lens receiving the second collimated beam;
a selected one of the second and third assemblies comprising a further optical fiber; and
a first optical film arranged between the first assembly and the selected one of the second and third assemblies.

20. The optical device of claim 19, wherein the optical film is a selected one of a band pass filter, a long wave pass filter and a short wave pass filter and passes the first collimated beam while reflecting other beams, or a coupler film branching the first collimated beam into two different directions.

21. The optical device of claim 19, further comprising an isolator receiving and passing the first and second collimated beams output by the first assembly.

22. The optical device of claim 19, further comprising:
a coupler film receiving one of the first and second collimated beams and disposed between the first assembly and a corresponding one of the second and third assemblies, the coupler film having a reflection path; and
a photodiode disposed in the reflection path of the coupler film.

23. The optical device of claim 19, further comprising a band pass filter receiving one of the first and second collimated beams and disposed between the first assembly and a corresponding one of the second and third assemblies.

24. The optical device of claim 19, further comprising a second optical film receiving the first collimated beam output by the first assembly, and reflected any optical signal having a wavelength differing from that of the first collimated beam, the first and second optical fibers of the first assembly being coupled together and passing the optical signal between them through the lens and optical film.

25. The optical device of claim 24, wherein the second optical film reflects an excitation beam, the excitation beam amplifying a signal beam transmitted through an optical fiber containing rare earth additives.

26. The optical device of claim 25, wherein one of the two fibers of the first assembly transmits a multiplexed form of a signal beam and an excitation beam.

* * * * *